(12) United States Patent  
Lindsey et al.

(10) Patent No.: US 8,012,239 B2  
(45) Date of Patent: Sep. 6, 2011

(54) METHOD AND APPARATUS FOR DETECTING LEAKS IN BASHOUSE BAGS

(75) Inventors: Steve Lindsey, Russellville, AL (US); Matthew Ashby, South Haven, MS (US)

(73) Assignee: Nucor Corporation, Charlotte, NC (US)

( * ) Notice: Subject to any disclaimer, the term of this patent is extended or adjusted under 35 U.S.C. 154(b) by 460 days.

(21) Appl. No.: 11/870,587

(22) Filed: Oct. 11, 2007

(65) Prior Publication Data

US 2009/0095152 A1      Apr. 16, 2009

(51) Int. Cl.  
*B01D 46/42* (2006.01)
(52) U.S. Cl. ...................... 95/8; 96/414; 96/404; 96/418
(58) Field of Classification Search ........... 95/8; 96/417  
See application file for complete search history.

(56) References Cited

U.S. PATENT DOCUMENTS

| | | | |
|---|---|---|---|
| 4,304,492 A * | 12/1981 | Fox | ............................... 356/439 |
| 4,322,224 A | 3/1982 | Roth | |
| 4,464,184 A | 8/1984 | Cera et al. | |
| 4,922,841 A | 5/1990 | Kent | |
| 5,017,200 A | 5/1991 | Price et al. | |
| 6,476,911 B1 * | 11/2002 | Rose | ............................. 356/337 |
| 2002/0187083 A1 | 12/2002 | Bundy | |
| 2004/0221721 A1 | 11/2004 | Prill | |

OTHER PUBLICATIONS

International Search Report in PCT/US2008/079537.

* cited by examiner

*Primary Examiner* — Duane Smith  
*Assistant Examiner* — Tiffany N Palmer  
(74) *Attorney, Agent, or Firm* — Hahn, Loeser & Parks LLP; Arland T. Stein

(57) ABSTRACT

Methods and systems for detecting the presence of a leak in a baghouse bag installed in a baghouse system having at least one compartment. The methods include using a system to acquire electrical signals corresponding to the opacity of gas flow through an outlet of a baghouse system during a start-up of one or more compartments of the baghouse system and comparing the electrical signals corresponding to the opacity of the gas flow with electrical signals characteristic of a leak in at least one of the baghouse bags of the baghouse system.

22 Claims, 4 Drawing Sheets

METHOD AND APPARATUS FOR DETECTING LEAKS IN BASHOUSE BAGS

BACKGROUND AND SUMMARY

This invention relates to baghouse systems, and to methods and systems for detecting the presence of a leak in a bag installed in a baghouse system.

Regulatory controls have become increasingly important as air quality standards and resulting industrial emission permits have become more stringent. Some industrial applications use filters to separate dust and other airborne particulate matter from the air. A baghouse filter is one apparatus used to reduce emissions of particulate matter from industrial sources and improve air quality by filtering dust and other particulate from the air.

A baghouse system is one type of dust collection apparatus that uses filtration media, usually of fabric, forming bags that collect the dust. A baghouse may include a housing separated into two or more chambers or plenums one internal and one external to the bags. In an exemplary baghouse, air enters the baghouse system through "dirty air" chambers internal of the bags and passes through a desired number of tubular fabric sheets, or baghouse bags into the "filtered air" chambers external of the bags. Within each dirty air chamber the bag acts as a filter medium to collect the particulate matter in the air. The baghouse bags are usually made of a fabric material suitable for filtering airborne particulate matter to prevent the passage of particles larger than a specified size, while allowing air to pass through. The effectiveness of the baghouse system may be measured by the opacity of the filtered air exiting the baghouse system.

In operation, dirty air containing dust and other particulate matter from an industrial process enters a "dirty air" chamber and is forced or drawn through the baghouse bags. A fan or blower may be used to force the dirty air into the "dirty air" chamber, or draw air from the "filtered air" chamber of the baghouse system. The particulate matter in the dirty air that is larger than the openings in the filter medium of the bags collects on the surface of the bags on the dirty air side while the filtered air passes through the bags. The resulting filtered air exits the baghouse system through an exhaust duct or stack. A fan or blower forces or draws the dirty air through the baghouse bags and into the filtered air chambers.

In the baghouse system, the bags tend to wear and develop leaks over time. Such leaks degrade the filtering effectiveness of the baghouse system and increase the opacity of the exiting filtered air. A baghouse may include a plurality of bags that will eventually need to be replaced. Such replacement may be performed at scheduled intervals corresponding to a predetermined expected useful life of the bags. However, some baghouse bags may function beyond their expected life, while others develop leaks and become ineffective before their scheduled life expectancy. Replacing specific bags that develop leaks before the scheduled useful life has been impractical in the past because it is difficult to determine which bag or bags of the baghouse system have developed leaks.

It is desirable to replace or repair such leaking bags as they develop to maintain an efficient and effective baghouse system and maintain the air quality of the exiting air. However, a baghouse system can employ tens, hundreds, or even thousands, of filtration bags at the same time. In the past, a person had to go into the baghouse and visually inspect the bags to find which had developed leaks and whether or not such leaking bags could be repaired or had to be replaced. Such a human visual inspection was very time-consuming and inefficient. Furthermore, visual inspection by a person was inadequate for detecting small leaks in bags because small leaks are, at best difficult to see. Unfortunately, such a small leak may still cause unacceptable performance of the baghouse system and degradation of the air quality.

Various methods have been developed in the past to aid in visual inspection, such as introducing fluorescent powders into the air stream, and inspecting the bags with black light or other lights. While these methods have improved inspection techniques, the effectiveness of such methods was limited and expensive. These methods still relied on the accuracy of visual inspection. What has been needed is a more efficient method and system for detecting leaks in bags of baghouse systems, and a method and system that can detect small leaks and the location of leaks in the baghouse system.

A method is presently disclosed for detecting a leak in a bag installed in a baghouse system, comprising the steps of:
   a) positioning a sensor to measure opacity in an outlet of a baghouse system having at least one compartment;
   b) measuring opacity of gas flow through the outlet during start-up of one or more compartments in the baghouse system;
   c) generating electrical signals corresponding to the opacity measured by the sensor; and
   d) comparing the electrical signals corresponding to the opacity measured by the sensor with a reference characteristic of a leak in a bag of the baghouse bag system.

The reference characteristic of a leak in a bag of the baghouse bag system may be an electrical signal representing opacity measurements from the sensor during the start-up of at least one compartment in the baghouse system with a leak in a bag. Alternately or in addition, the reference characteristic of a leak in a bag in the baghouse bag system may include a predetermined threshold value derived from empirical opacity measurements.

The method of detecting a leak in a bag installed in a baghouse system may comprise the steps of:
   a) positioning a light emitting diode in an outlet of a baghouse system having at least one compartment;
   b) positioning a sensor to measure light emitted from the light emitting diode to measure opacity in the outlet of a baghouse system;
   c) measuring opacity of gas flow through the outlet during start-up of one or more compartments of the baghouse system;
   d) generating electrical signals corresponding to the opacity measured by the sensor; and
   e) comparing the electrical signals corresponding to the opacity measured by the sensor with electrical signals characteristic of a leak in a bag of the baghouse bag system.

The method of detecting a leak in a bag installed in a baghouse system may include the steps of starting to acquire opacity measurements from the sensor prior to the start-up of one or more compartments of the baghouse system and comparing the electrical signals corresponding to the opacity measured prior to the start-up with the electrical signals corresponding to the opacity measured by the sensor at least during the start-up to identify the presence of a leak in a bag of the baghouse bag system. Alternately or in addition, the method may include the steps of generating a reference electrical signal representing opacity measurements from the sensor during the start-up of at least one compartment in the baghouse system with a leak in a bag and comparing the electrical signals corresponding to the opacity measured by the sensor with the reference electrical signal to determine when a leak has occurred in a bag of the baghouse system. The method may include the steps of comparing the opacity measured by the sensor to a predetermined threshold value and indicating a detected leak in the baghouse bag if the opacity exceeds the predetermined threshold value.

The method of detecting a leak in a bag installed in a baghouse system may include determining the approximate location of a baghouse bag having a leak in at least one compartment using the time between the start-up of the compartment or compartments and a measured change in opacity by the sensor characteristic of a leak in a bag, and the flow rate of gas between the compartment or compartments starting-up and the sensor.

A system is disclosed for detecting a leak in a bag installed in a baghouse system, comprising:

a) a sensor positioned to measure opacity in an outlet of a baghouse system having at least one compartment; and b) a processor capable of generating electrical signals corresponding to the opacity measured by the sensor and comparing the electrical signals corresponding to the opacity measured by the sensor with electrical signals characteristic of a leak in a bag of the baghouse bag system.

Alternately, a system for detecting a leak in a bag installed in a baghouse system may comprise:

a) a light emitting diode positioned in an outlet from a baghouse system having at least one compartment;

b) a sensor positioned to measure light emitted by the light emitting diode to measure the opacity gas flow in an outlet from a baghouse system; and c) a processor to generate electrical signals corresponding to the opacity measured by the sensor and compare the electrical signals to the opacity measured by the sensor with electrical signals characteristic of a leak in a bag of the baghouse bag system.

The electrical signals characteristic of a leak may comprise reference electrical signals representing opacity measurements from the sensor during start-up of at least one compartment of the baghouse system with a leak in a bag. The processor may be capable of processing electrical signals before and during start-up of one or more compartments of the baghouse system. Further, the processor may be capable of processing electrical signals corresponding to the opacity measured to continually generate a rate-of-change signal to compare with the electrical signals characteristic of a leak in a bag of the baghouse bag system, and the processor may compare a rate-of-change signal with a predetermined rate of change value derived from empirical opacity measurements. The processor may be capable of determining the approximate location of a baghouse bag having a leak in a compartment using the time between start-up of the compartment and a change in opacity characteristic of a leak in a bag and the gas flow rate.

A baghouse filter system is disclosed comprising:

a) a housing comprising at least one compartment, each compartment comprising a first chamber and a second chamber, an inlet into the first chamber and an outlet from the second chamber, and a plurality of filter bags operatively positioned between the first and second chambers, the filter bags capable of filtering airborne particulate matter;

b) a blower operatively connected with the housing and capable of flowing air from the inlet through the filter bags and through the outlet;

c) a sensor positioned to measure opacity of gas flow from the outlet of the baghouse filter system; and d) a processor capable of generating electrical signals corresponding to the opacity measured by the sensor and comparing the electrical signals corresponding to the opacity measured by the sensor with electrical signals characteristic of a leak in a bag of the baghouse bag system.

The sensor may be positioned to measure opacity in an outlet of the baghouse system and may be capable of measuring light emitted by a light emitting diode to measure the opacity of gas flow. The processor may be capable of processing electrical signals before and during start-up of the baghouse system. Further, the processor may be capable of comparing the electrical signals corresponding to the opacity measured by the sensor with a reference electrical signal representing opacity measurements from the sensor during start-up of the baghouse system with a leak in a bag of the baghouse bag system to determine when a leak has occurred in a bag of the baghouse system.

These and other advantages and novel features, as well as details of illustrated embodiments thereof, will be more fully understood from the following description and drawings. Further disadvantages of conventional, traditional, and proposed embodiments will become apparent to one of skill in the art, from a description of embodiments of the system and method as set forth in the remainder of the present application with reference to the drawings.

DETAILED DESCRIPTION OF THE DRAWINGS

Figure 1:
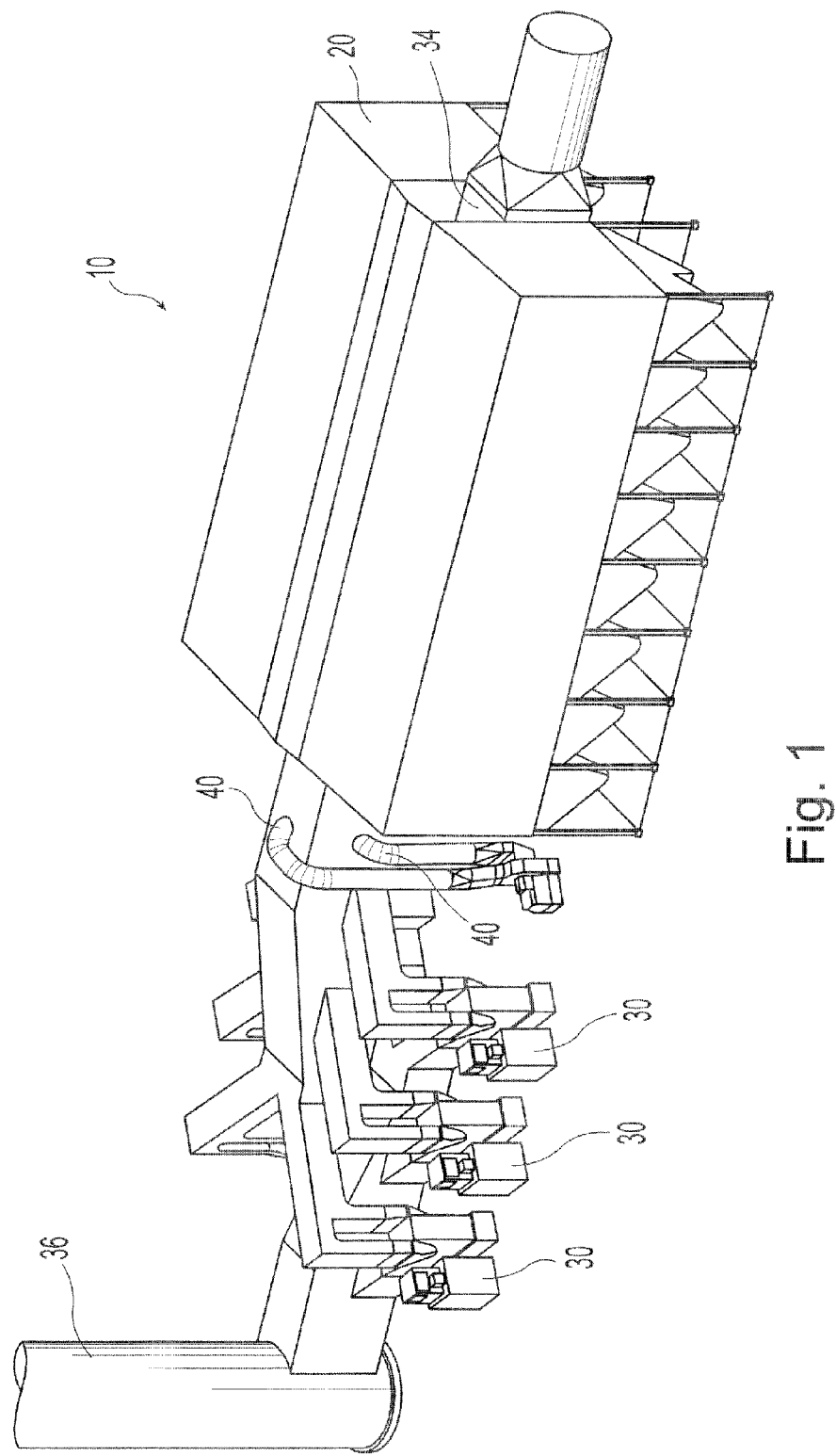
FIG. 1 is diagrammatical prospective view of a baghouse filter system.

FIG. 1 shows an example of a baghouse system 10. The baghouse system 10 includes a baghouse housing 20 comprising at least one baghouse bag 22, at least one blower 30 and an inlet 32 to transmit a flow of dirty air to the baghouse housing 20. The baghouse blower 30 includes at least one fan or other mechanism for moving air. During operation, the baghouse blower 30 forces or draws dirty air and/or gases containing particulate matter into the baghouse inlet 32, and forces or draws the dirty air into the baghouse housing 20 via the ductwork 34. As shown in FIG. 1, the blower 30 may include a plurality of fans that draw air into and through the baghouse housing 20.

Figure 2:
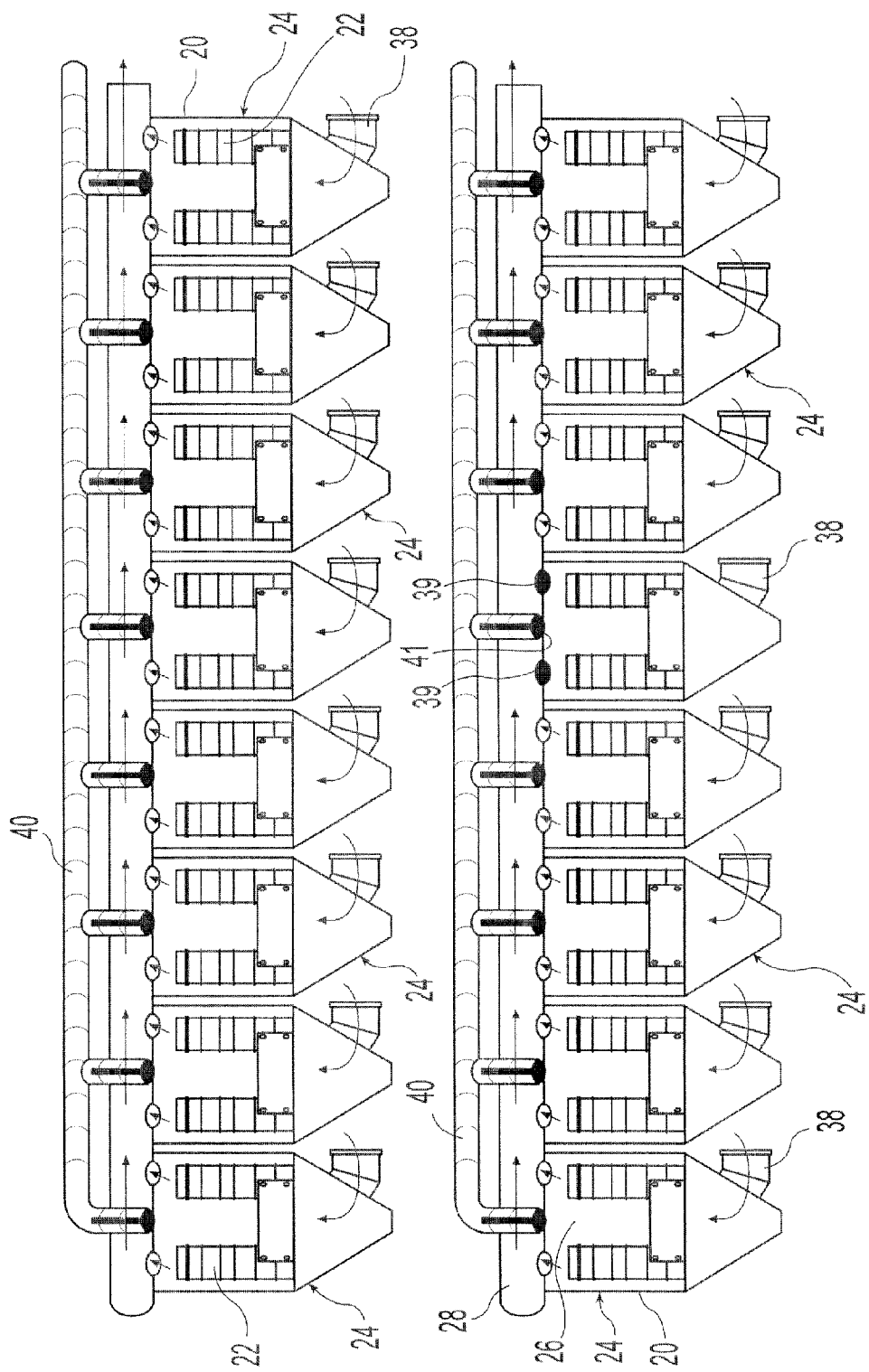
FIG. 2 is an exemplary schematic diagram showing compartments in a baghouse housing.

The baghouse housing 20 is separated into one or more compartments 24. Each compartment has a first chamber, or a "dirty air" chamber, and a second chamber, or a "filtered air" chamber, with the baghouse inlet directing dirty air into the first chamber, or "dirty air" chamber, and the baghouse outlet connected to the second chamber, or the "filtered air" chamber. Typically, the housing has a plurality of compartments 24 as shown in FIG. 2. As shown in FIG. 2, the baghouse housing 20 may have sixteen compartments. The baghouse system 10 may be capable of operating each compartment 24 independently of the other compartments, such that one or more compartments 24 may be turned off by closing one or more ductwork air valves 39 to close the airflow into the outlet duct, and optionally one or more ductwork air valves 38 at the inlet of the compartment. In an embodiment that draws dirty air into the baghouse housing 20, closing outlet air valves 39 blocks the suction from the blowers 30 disabling the draw of dirty air. In this way, one or more compartments 24 may be turned off for cleaning or maintenance while the remaining compartments continue to operate and filter air. The number of compartments may be selected such that the baghouse system 10 is capable of filtering a desired volume of air with one or more compartments turned off.

Each compartment 24 has at least one baghouse bag 22. Typically, each compartment 24 may have a plurality of baghouse bags 22 in a baghouse bag system.

As the dirty air enters the baghouse inlet 32, the dirty air is directed through the ductwork 34 into the compartments 24 that are operational, or not turned off. In an embodiment that draws dirty air into the baghouse housing 20, the blower 30 creates a suction that draws air through the outlet ductwork 28 creating suction through the compartment enabling dirty air to be drawn through an inlet into the "dirty air" chamber. As dirty air enters the inlet of a compartment 24 through the inlet air valve 38 or other ductwork inlet, the air comes in contact with the baghouse bags 22. The suspended particulate matter in the dirty air collects on the surfaces of the bags 22 as the air is filtered by flowing through the baghouse bags 22 and into a filtered air chamber 26 in the outlet of the baghouse system 10. As a result, filtered air flows through one or more outlet air valves 39 into outlet ductwork 28 and exits the baghouse system 10 through a stack 36.

The baghouse system 10 may be self cleaning. The baghouse system may include a reverse airflow duct 40 into the filtered air chamber 26 of each compartment 24. When a compartment is turned off and not receiving dirty air, the compartment may be cleaned by directing air through the reverse airflow duct 40 providing reverse air flow through the baghouse bags 22. The reverse air flow vibrates the bags and causes dust and particulate matter to fall from the bags and into a dust collection system (not shown). A mechanical vibrator (not shown) may also be provided to shake the baghouse bags 22 during the cleaning cycle. The baghouse system 10 may include a cleaning cycle where the outlet air valves 39, and optionally, the inlet air valves 38 of one or more compartments 24 are closed to turn off the flow of dirty air to the compartment, reverse air flowed through the reverse airflow duct 40 and through reverse airflow valve 41, dust and particulate matter removed from the compartment through the dust collection system (not shown), and then the air valve 41 closed and inlet and outlet air valves 38, 39 opened to turn on the compartment 24. Each compartment 24 in the baghouse system 10 may be cleaned in a predetermined order, and the compartments may repeatedly be cleaned as the baghouse operates. As an example, the cleaning cycle may take about 75 seconds, and a sixteen compartment baghouse may cycle through all of its compartments in about 20 or 21 minutes. In this way, each compartment may be repeatedly cleaned about every 20 or 21 minutes.

The baghouse system 10 may include a baghouse controller 42 operationally connected to the blower 30 such that the controller 42 may control the operation of the baghouse system 10, including control of the blower 30, control of airflow into the compartments 24, and control of the cleaning cycle. Such control may include, for example but not limited to opening and closing inlet and outlet air valves 38, 39 of the compartments 24, controlling the cleaning cycle, opening and closing reverse airflow valves 41, turning the blower 30 on and off, controlling the volume flow rate of the air through the blower, maintaining a desired pressure draft in the baghouse system, and other system functions. The controller 42 may include a computer-based device such as, for example, a personal computer (PC) or a programmable logic controller (PLC).

The baghouse system 10 includes an opacity measuring device or sensor 50 capable of measuring the opacity of the filtered air. The opacity sensor 50 may be positioned adjacent to or within the filtered air chamber 26, the outlet ductwork 28, the stack 36, or another suitable outlet of the baghouse. Opacity is a measure of light transmitted through the air flow containing the airborne particles. Particulate matter in the air causes the measured opacity of the exiting air to increase. The suspended particulate matter in the air flow tend to scatter light and decrease the amount of transmitted light. An opacity measurement of zero indicates that substantially all light passes through and the air flow is substantially free of particles in the air. The opacity sensor 50 may include an incandescent light, a light emitting diode (LED) device, a laser, a fiber optics device, or any other device or configuration that allows for the measurement of opacity of the surrounding air; however, a light emitting diode has been found to provide most accurate readings of opacity and in providing leak detection. The opacity sensor 50 may be configured to measure and record opacity measurements over time. The opacity sensor 50 communicates output electrical signals, which may be analog or digital, to the controller 42, a processor 44, a data storage device and/or other device for processing or later retrieval (not shown).

The opacity sensor 50 may be used to measure the relative amount of light and indirectly the amount of airborne particulate matter remaining in the filtered air in the outlet of the baghouse. The opacity sensor 50 may be positioned in the outlet of the baghouse, such as but not limited to within the stack 36 of the baghouse, to enable the detection of a leak in any of the baghouse bags 22, without discerning which bag 22 actually has the leak. The opacity sensor 50 may be positioned about two-thirds of the distance up the stack to measure the opacity of the flow in the stack. Alternately or in addition, at least one opacity sensor 50 may be positioned in the outlet ductwork 28, and/or in the filtered air chamber 26 of each compartment 24, and may be proximate to at least one baghouse bag 22, or within a desired area or section of the compartment 24, for example, to further identify the approximate location of a leak detected by the sensor. The opacity sensor 50 may be positioned in any desired location in the baghouse system to measure the opacity of the filtered air. As used herein, the term sensor location refers to a sensor position in the outlet of the baghouse system adjacent to or within the filtered air chamber 26 of the compartment 24, the outlet ductwork 28, the stack 36, or other desired location within the system for measuring the opacity of the filtered air.

We have found that by collecting and analyzing opacity measurements during start-up of a compartment 24 after cleaning, or during the initial start-up of the baghouse system 10, we can determine whether there is a leak in one or more baghouse bags. The opacity sensor 50 may be directed by the controller 42 to take opacity measurements at least several seconds before a compartment under cleaning starts up. As a compartment is turned on and comes up to speed, the opacity sensor 50 continues to take opacity measurements. If there is a leak in a baghouse bag 22, there will be an amount of particulate matter released into the air on start-up, and when the particulate matter reaches the opacity sensor, a corresponding rapid change in opacity will be reflected in the opacity measurements or the sensor output signal. The change in opacity may be include a rapid increase in opacity, followed by a rapid decrease in opacity. If there is no leak in a baghouse bag 22, then the opacity will remain steady, or a relatively small increase in particulate matter in the flow at the sensor location and, therefore, no sudden increase in opacity reflected in the opacity measurements. By analyzing opacity at the start-up of a compartment after cleaning, or during the initial start-up of the baghouse system 10, even small holes in the baghouse bags 22, such as about 1 inch (about 2.5 centimeter) diameter holes, may be detected. Further, the approximate location of the leaking bag 22 within the compartment may also be determined using the time between the start-up of the compartment or compartments and a measured change in opacity by the sensor characteristic of a leak in a bag, and the rate of gas flow between the compartment or compartments starting-up and the sensor. By using the gas flow rate and the time period between the start-up of the compartment after cleaning and the spike or other change in opacity at the sensor 50, the location of the hole within the compartment 24 may be estimated. For example, for a known linear flow rate, if the spike in opacity registered quickly, the hole may be in a bag in the front of the compartment. If the spike or other change in opacity was delayed a few seconds, the hole may be in a bag in the rear of the compartment.

For a small leak in a baghouse bag, after start-up of the compartment with the leak, the measured opacity will spike up with the cloud of suspended particulate matter, but then may quickly return to about the opacity level of before the start-up of the compartment. The reason for this is that after an initial spike after start-up, the volume of air flowing through the baghouse housing 20 may distribute the particles from the leak throughout the flow. For a large leak or a blow-out in a baghouse bag, the measured opacity will spike up to a greater level, and may return to an elevated opacity level.

Figure 3:
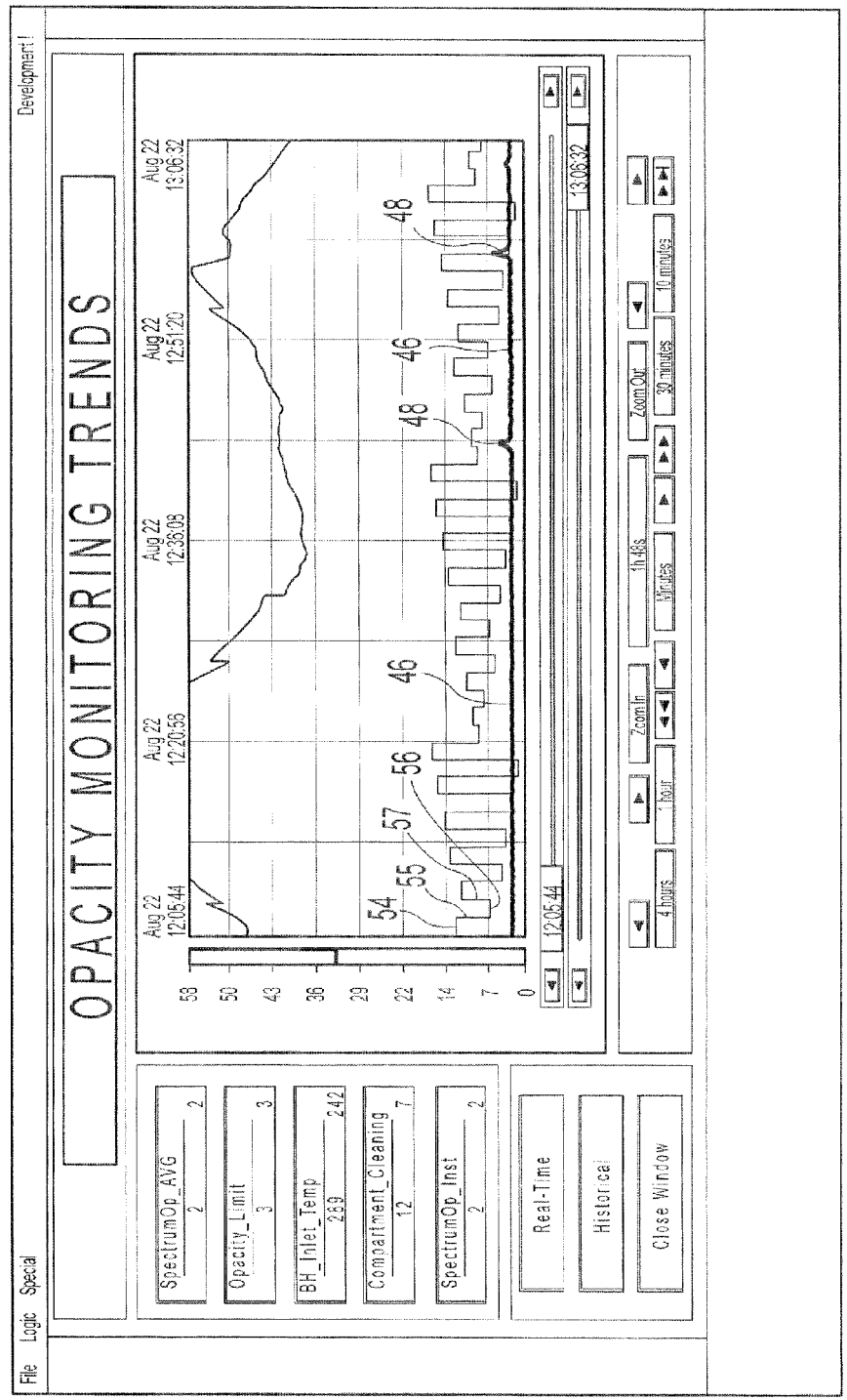
FIG. 3 is an exemplary plot of opacity measured as compartments are turned on and off.
Figure 4:
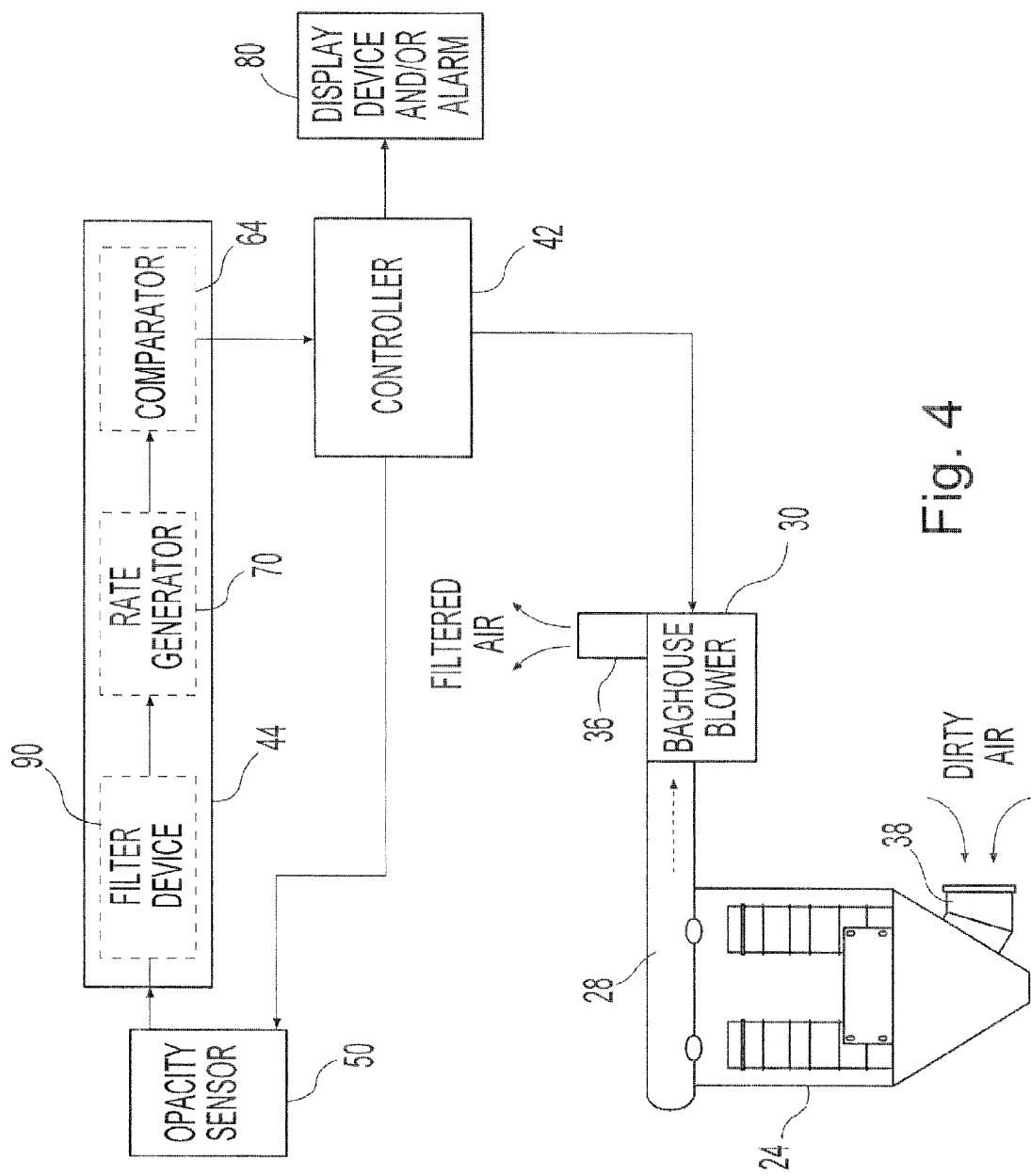
FIG. 4 is a block diagram of a system in a baghouse bag system in accordance with certain embodiments.

As shown in FIG. 3, an opacity plot 46 may be displayed over time, and may be may be compared to a plot of the baghouse cleaning cycle. In FIG. 3, the baghouse cleaning cycle includes a first compartment being cleaned for a time period 54. At time 55, the cleaning of the first compartment stops and the first compartment is turned on, and a second compartment is turned off for cleaning. For time period 56, the second compartment is cleaned, until time 57 when the second compartment is turned on and a third compartment is turned off, and so on continuing until all of the compartments are cleaned, and subsequently repeating as desired. A spike 48 in the opacity plot 46 may indicate a leak in at least one baghouse bag.

The size of the spike 48 may be monitored to determine when the hole should be repaired. A large spike with a continued increase in opacity may indicate a blow-out in a bag. If the increase in opacity, or spike, is greater than a predetermined threshold, the controller 42 may turn off the compartment 24 for repair. When an increase in opacity or spike is less than the predetermined threshold, the controller 42 may identify the compartment as a possible leak for continued monitoring.

A hole in a baghouse bag 22 may cause damage to adjacent bags, as a stream of gases or air containing abrasive particulate matter may impinge on an adjacent bag causing wear. For this reason, identifying the presence of a small hole is desired so as to enable repair to the bag to reduce the wearing of adjacent bags.

The presence of holes in baghouse bags may also be used as an indicator of other damage in the compartment. The compartment 24 may include metal dividers (not shown) adjacent the baghouse bags that may flex during the operation and cleaning of the compartment. Continual flexing causes fatigue cracks and fractures to appear in the dividers. Such cracks and fractures may cause wear and cutting of the baghouse bags that rub against the broken metal. Thus, by monitoring opacity upon start-up of the compartments and identifying leaks in the baghouse bags, such cracks and fractures in the metal dividers may be identified and repaired reducing additional damage.

Holes in the baghouse bags 22 may be detected by comparing electrical signals corresponding to the opacity measured by the sensor, such as but not limited to analog, digital, sample digital data, threshold values, tracing, or any other signal corresponding to the opacity measured by the sensor, with a reference characteristic of having a leak in a baghouse bag, such as but not limited to analog or digital electrical signals, sample digital data, threshold values, tracing, or any other reference characteristic of having a leak in a baghouse bag. Whether the opacity measurements are characteristic of a leak is evaluated depending on how the signal is monitored. For example, as discussed above, the characteristic response may be a spike or an increase in opacity exceeding a predetermined threshold. Alternately or in addition, the characteristic response may be a predetermined rate of change during a rapid or accelerating increase in opacity.

The sensor output signal comprising opacity measurements may be input to a processor 44. The processor 44 may display the opacity measured by the sensor 50 on a computer screen, print-out, or tracing observed or monitored by an operator. The operator may monitor the display and compare the visual display with a predetermined reference characteristic of having a leak in a baghouse bag, such as a spike greater than a threshold value, or an increase in opacity exceeding a threshold value. FIG. 3 shows a plot of the measured opacity 46 on a computer screen that may be monitored by an operator. When the operator observes the measured opacity matching the predetermined reference characteristic of having a leak, such as a spike, the operator may take action as desired, such as notify others, turn off a compartment with a leak, or other actions. In this example, when the operator observes the spike 48, the operator may determine whether the increase in opacity is greater than a predetermined threshold value.

Alternately or in addition, the processor 44 may include a computer or other automated processor such that electrical signals corresponding to the opacity measured by the sensor may be monitored by the processor 44 to determine whether there is a leak in a baghouse bag. The processor 44 may be capable of processing and comparing the electrical signals from the opacity sensor 50 with predetermined electrical signals characteristic of a leak in a baghouse bag. The electrical signals as a reference characteristic of a leak in a baghouse bag 22 may be an electrical signal representing opacity measurements from the sensor during start-up of a compartment with a leak in a baghouse bag 22. Alternately or in addition, the electrical signals characteristic of a leak in a bag of the baghouse bag system may comprise a predetermined threshold value derived from empirical opacity measurements.

The processor 44 may include a comparator 64 capable of receiving the output of the opacity sensor 50 and comparing the measured resultant rate of change in opacity, or spike, for example, to a pre-determined threshold value or rate. The threshold value may be set based on a correlation of opacity measurements from the sensor with the presence of at least one leak in a baghouse bag 22. If the level of the rate or spike is greater than the threshold value, then the processor 44 may send a signal to the controller 42 identifying a leak in at least one of the baghouse bags 22. The controller 42 may then activate a display device, an alarm 80, an indicator, or a combination thereof, to alert an operator of the system 10 to the detected leak. Alternately or in addition, the processor 44 may generate a running average of measured opacity values and compare the running average with a reference or electrical signal characteristic of having a leak, such as a threshold rate of change, or a threshold opacity value.

For some opacity sensors 50, the electrical signals from the opacity sensor may be processed to further enable comparing the electrical signals from the opacity sensor 50 with predetermined electrical signals characteristic of a leak in a baghouse bag. The processor 44 may include a rate generator 70, where the opacity measurements are passed to the rate generator 70 capable of generating an electrical signal corresponding to the opacity measured by the sensor. In this way, the electrical signal from the rate generator 70 is monitored and compared to a reference electrical signal to determine whether the opacity is characteristic of a leak in a baghouse bag. The reference electrical signal characteristic of a leak in a bag of the baghouse bag system may be a rate of change of opacity in units of opacity per second exceeding a predetermined threshold rate-of-change value. Alternatively, the rate generator 70 may act as a simple high-pass filter that outputs a spike when a change of opacity exceeds a pre-determined threshold value or rate.

Alternately or in addition to a rate generator 70, the processor 44 may employ a filter device 90 that receives opacity measurements from the opacity sensor 50. The filter device 90 may be an analog or digital filter that implements any one or more of various filter functions, including a high-pass filter capability, a low-pass filter capability, a band-pass filter capability, a running average capability, a simple average capability, a weighted average capability, a simple difference capability, or any other filtering capability for discerning whether the opacity measurements are characteristic of or correspond to the presence of a leak. Again, a high-pass filter capability may be used to generate a spike out of the filter corresponding to a rapid increase in opacity.

As a further alternative, the processor 44 may use both the filter device 90 and the rate generator 70 in series. For example, it may be desirable to use the filter device 90 to filter out noise that may be present in the opacity measurements and then provide the filtered results to the rate generator 70. For example, the noise may be due to a low frequency variation in opacity that tends to occur because of the flow of gas or air through the system. In another embodiment, it may be desirable to implement the filter device 90 after the rate generator 70, for example, to smooth out the rate signal from the rate generator 70.

The filter device 90, rate generator 70, comparator 64, or combinations thereof may be implemented in a single device, such as the processor 44, or as part of the controller 42. If implemented in a computer-based device, the functions of the filter device, rate generator, and/or comparator 64 may be implemented in software running on the computer-based device, for example.

The system 10 may be used to continuously or periodically monitor opacity of filtered air or gas from the baghouse. For example, if a leak is not detected upon start-up of a compartment after cleaning, but a baghouse bag 22 later fails during operation of the baghouse system 10 by developing a leak, the leak may be detected by the system 10 in a subsequent cleaning cycle. Different filter functions and threshold values may be used for determining the size of a bag leak, estimated location of bag leak, whether maintenance of other baghouse components is needed, and other maintenance indicators. The filter functions and threshold values may be set based on an empirical correlation between measured opacity during the formation of a leak in a baghouse bag 22 or other maintenance event.

In operation, the presence of a leak in at least one baghouse bag 22 installed in a baghouse housing 20 may be detected using the system 10 of FIG. 1. An opacity sensor is positioned in an outlet of the baghouse system, and is used to measure opacity of gas flow through the outlet of the baghouse system during start-up of the baghouse system. The opacity sensor may be positioned adjacent to or within the filtered air chamber 26 of the compartment 24, the outlet ductwork 28, the stack 36, or other desired location within the system for measuring the opacity of the filtered gas or air flow. As used herein, the term start-up may refer to a period from just before (e.g., at least a few seconds or minutes before) turning on of a compartment 24 after cleaning to some time after (e.g., about 30 seconds or more) after turning on the compartment after cleaning. Alternately, the term start-up may refer to a time period from turning on of the baghouse blower 30 to some time after (e.g., at least about 1 minute after) turning on the baghouse blower 30 upon initial start-up of the baghouse system 10.

Then, generating electrical signals corresponding to the opacity measured by the sensor, and comparing the electrical signals corresponding to the opacity measured by the sensor with a reference or electrical signals characteristic of a leak in a bag of the baghouse bag system to determine if a leak is in a bag. A reference or electrical signals characteristic of a leak in a bag of the baghouse bag system may comprise an observed rate of change in opacity, a measured increase in opacity, a measured opacity level, or a combination thereof observed during the start-up time, for example. If the opacity measurements indicate a leak in a baghouse bag, then the system 10 may indicate a detected leak in the baghouse bag 22. The system 10 may also indicate when there is no detected leak in the baghouse bag 22.

Additional opacity measurements of the air or gas flow proximate to the opacity sensor in an outlet of a baghouse system may be acquired during operation of the baghouse system 10. The method may then loop back through the previous steps until identifying a measured opacity or a response that is characteristic of a leak. The change in opacity or the measured response that is characteristic of a leak, or the characteristic change, may comprise, for example, a spike in the opacity rate or a running average of opacity that increases above a threshold value.

In summary, methods and systems for identifying a need for maintenance in a baghouse system are disclosed. The methods include using a system to acquire opacity measurements of gas or air proximate to an opacity sensor of a baghouse system during a start-up time of the baghouse system and determining if a characteristic change in opacity has occurred in response to the opacity measurements. The characteristic change correlates to a leak in at least one of the baghouse bags of the baghouse system.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of detecting a leak in a bag installed in a baghouse system, comprising the steps of:

positioning a sensor to measure opacity in an outlet of a baghouse system having at least one compartment;

measuring opacity of gas flow through the outlet during start-up of one or more compartments in the baghouse system;

generating electrical signals corresponding to the opacity measured by the sensor; and comparing the electrical signals corresponding to the opacity measured by the sensor at least during start-up of one or more compartments with a reference characteristic of a leak in a bag of the baghouse bag system.

2. The method of detecting a leak in a bag installed in a baghouse system as claimed in claim 1, comprising in addition the steps of:

starting to acquire opacity measurements from the sensor prior to the start-up of one or more compartments of the baghouse system; and comparing the electrical signals corresponding to the opacity measured prior to the start-up with the electrical signals corresponding to the opacity measured by the sensor at least during the start-up to identify a presence of a leak in a bag of the baghouse bag system.

3. The method of detecting a leak in a bag installed in a baghouse system as claimed in claim 1, comprising in addition the steps of:

generating a reference electrical signal representing opacity measurements from the sensor during the start-up of at least one compartment in the baghouse system with a leak in a bag; and comparing the electrical signals corresponding to the opacity measured by the sensor with the reference electrical signal to determine when a leak has occurred in a bag of the baghouse system.

4. The method of detecting a leak in a bag installed in a baghouse system as claimed in claim 1 where the reference characteristic of a leak in a bag of the baghouse bag system is an electrical signal representing opacity measurements from the sensor during the start-up of at least one compartment in the baghouse system with a leak in a bag.

5. The method of detecting a leak in a bag installed in a baghouse system as claimed in claim 1 further comprising:

determining an approximate location of a baghouse bag having a leak in a compartment using the time between the start-up of the compartment or compartments and a measured change in opacity by the sensor characteristic of a leak in a bag, and the rate of gas flow between the compartment or compartments starting-up and the sensor.

6. The method of detecting a leak in a bag installed in a baghouse system as claimed in claim 1 where the reference characteristic of a leak in a bag in the baghouse system comprises a predetermined threshold value derived from empirical opacity measurements.

7. The method of detecting a leak in a bag installed in a baghouse system as claimed in claim 1 further comprising:

comparing the opacity measured by the sensor to a predetermined threshold value; and indicating a detected leak in a baghouse bag if the opacity exceeds the predetermined threshold value.

8. A method of detecting a leak in a bag installed in a baghouse system, comprising the steps of:

positioning a light emitting diode in an outlet of a baghouse system having at least one compartment;

positioning a sensor to measure light emitted from the light emitting diode to measure opacity in the outlet of a baghouse system;

measuring opacity of gas flow through the outlet during start-up of one or more compartments of the baghouse system;

generating electrical signals corresponding to the opacity measured by the sensor; and comparing the electrical signals corresponding to the opacity measured by the sensor at least during start-up of one or more compartments with electrical signals characteristic of a leak in a bag of the baghouse bag system.

9. The method of detecting a leak in a bag installed in a baghouse system as claimed in claim 8, comprising in addition the steps of:

generating a reference electrical signal representing opacity measurements from the sensor during the start-up of one or more compartments of the baghouse system with a leak in a bag; and comparing the electrical signals corresponding to the opacity measured by the sensor with the reference electrical signal to determine when a leak has occurred in a bag of the baghouse system.

10. The method of detecting a leak in a bag installed in a baghouse system as claimed in claim 9 where the reference electrical signal characteristic of a leak in a bag in the baghouse bag system comprises a predetermined threshold rate-of-change value derived from empirical opacity measurements.

11. The method of detecting a leak in a bag installed in a baghouse system as claimed in claim 8 further comprising:

determining an approximate location of a baghouse bag having a leak in a compartment using the time between the start-up of the compartment and a change in opacity characteristic of a leak in a bag and the rate of gas flow from the compartment to the sensor.

12. A system for detecting a leak in a bag installed in a baghouse system, comprising:

a sensor positioned to measure opacity in an outlet of a baghouse system having at least one compartment, where the sensor is adapted to measure opacity of gas flow through the outlet at least during start-up of one or more compartments in the baghouse system; and a processor adapted to generate electrical signals corresponding to the opacity measured by the sensor and compare the electrical signals corresponding to the opacity measured by the sensor during start-up of one or more compartments with electrical signals characteristic of a leak in a bag of the baghouse bag system, where the processor is adapted to process electrical signals before and at least during start-up of one or more compartments of the baghouse system.

13. The system for detecting a leak in a bag installed in a baghouse system as claimed in claim 12, where electrical signals characteristic of a leak comprise reference electrical signals representing opacity measurements from the sensor during start-up of at least one compartment of the baghouse system with a leak in a bag.

14. The system of detecting a leak in a bag installed in a baghouse system as claimed in claim 12 where the processor is capable of processing electrical signals corresponding to the opacity measured and continually generating a rate-of-change signal to compare with the electrical signals characteristic of a leak in a bag of the baghouse bag system.

15. The system of detecting a leak in a bag installed in a baghouse system as claimed in claim 12 where the measured electrical signals corresponding to the opacity are rate-of-change signals and the electrical signals characteristic of a leak are predetermined rate of change values derived from empirical opacity measurements.

16. A system for detecting a leak in a bag installed in a baghouse system, comprising:
- a light emitting diode positioned in an outlet from a baghouse system having at least one compartment;
- a sensor positioned to measure light emitted by the light emitting diode to measure the opacity of gas flow in an outlet from the baghouse system, where the sensor is adapted to measure opacity of gas flow through the outlet at least during start-up of one or more compartments in the baghouse system; and
- a processor adapted to generate electrical signals corresponding to the opacity measured by the sensor and compare the electrical signals corresponding to the opacity measured by the sensor during start-up of one or more compartments with electrical signals characteristic of a leak in a bag of the baghouse bag system, where the processor is adapted to process electrical signals before and during at least start-up of one or more compartments of the baghouse system.

17. The system for detecting a leak in a bag installed in a baghouse system as claimed in claim 16, where
the processor is capable of comparing the electrical signals to the opacity measured by the sensor with a reference electrical signal representing opacity measurements from the sensor during start-up of one or more compartments of the baghouse system with a leak in a bag of the baghouse bag system to determine when a leak has occurred in a bag of the baghouse system.

18. The system of detecting a leak in a bag installed in a baghouse system as claimed in claim 16 where the processor is capable of determining an approximate location of a baghouse bag having a leak in a compartment using the time between start-up of the compartment and a change in opacity characteristic of a leak in a bag and the rate of gas flow.

19. A baghouse filter system comprising:
- a housing comprising at least one compartment, each compartment comprising a first chamber and a second chamber, an inlet into the first chamber and an outlet from the second chamber, and a plurality of filter bags operatively positioned between the first and second chambers, the filter bags capable of filtering airborne particulate matter;
- a blower operatively connected with the housing and capable of flowing air from the inlet through the filter bags and through the outlet;
- a sensor positioned to measure opacity of gas flow from the outlet of the baghouse filter system, where the sensor is adapted to measure opacity of gas flow through the outlet at least during start-up of one or more compartments in the baghouse system; and
- a processor adapted to generate electrical signals corresponding to the opacity measured by the sensor and compare the electrical signals corresponding to the opacity measured by the sensor during start-up of one or more compartments with electrical signals characteristic of a leak in a bag of the baghouse bag system, where the processor is adapted to process electrical signals before and during start-up of one or more compartments of the baghouse system.

20. The baghouse filter system of claim 19 where the sensor is positioned to measure opacity in an outlet of the baghouse system.

21. The baghouse filter system of claim 19 where the sensor is capable of measuring light emitted by a light emitting diode to measure the opacity of gas flow.

22. The baghouse filter system for detecting a leak in a bag installed in a baghouse system as claimed in claim 19, where
the processor is capable of comparing the electrical signals corresponding to the opacity measured by the sensor with a reference electrical signal representing opacity measurements from the sensor during start-up of the baghouse system with a leak in a bag of the baghouse bag system to determine when a leak has occurred in a bag of the baghouse system.

* * * * *

UNITED STATES PATENT AND TRADEMARK OFFICE
CERTIFICATE OF CORRECTION

| | | |
|---|---|---|
| PATENT NO. | : 8,012,239 B2 | Page 1 of 1 |
| APPLICATION NO. | : 11/870587 | |
| DATED | : September 6, 2011 | |
| INVENTOR(S) | : Steve Lindsey and Matthew Ashby | |

It is certified that error appears in the above-identified patent and that said Letters Patent is hereby corrected as shown below:

ON THE TITLE PAGE; ITEM (54);

In the title, "BASHOUSE" should read --BAGHOUSE--.

Signed and Sealed this
Seventeenth Day of April, 2012

David J. Kappos
*Director of the United States Patent and Trademark Office*

UNITED STATES PATENT AND TRADEMARK OFFICE
CERTIFICATE OF CORRECTION

PATENT NO. : 8,012,239 B2  Page 1 of 1
APPLICATION NO. : 11/870587
DATED : September 6, 2011
INVENTOR(S) : Steve Lindsey and Matthew Ashby It is certified that error appears in the above-identified patent and that said Letters Patent is hereby corrected as shown below:

ON THE TITLE PAGE; ITEM (54) and at Column 1, line 2

In the title, "BASHOUSE" should read --BAGHOUSE--.

This certificate supersedes the Certificate of Correction issued April 17, 2012.

Signed and Sealed this
Eighth Day of May, 2012

David J. Kappos
*Director of the United States Patent and Trademark Office*